United States Patent

Berger et al.

(10) Patent No.: US 10,223,508 B2
(45) Date of Patent: Mar. 5, 2019

(54) CONSUMER RIGHTS LOCKER

(75) Inventors: Richard Berger, Culver City, CA (US); Mitch Singer, Los Angeles, CA (US)

(73) Assignees: SONY CORPORATION, Tokyo (JP); SONY PICTURES TECHNOLOGIES INC., Culver City, CA (US)

( * ) Notice: Subject to any disclaimer, the term of this patent is extended or adjusted under 35 U.S.C. 154(b) by 700 days.

(21) Appl. No.: 13/436,567

(22) Filed: Mar. 30, 2012

(65) Prior Publication Data

US 2013/0262515 A1 Oct. 3, 2013

(51) Int. Cl.
G06F 17/30 (2006.01)
G06F 21/10 (2013.01)

(52) U.S. Cl.
CPC ........ G06F 21/10 (2013.01); *G06F 17/30867* (2013.01)

(58) Field of Classification Search
CPC ................................................ G06F 17/30867
See application file for complete search history.

(56) References Cited

U.S. PATENT DOCUMENTS

| | | | |
|---|---|---|---|
| 6,463,417 B1 * | 10/2002 | Schoenberg | ...................... 705/2 |
| 7,415,450 B2 | 8/2008 | Gopalan | |
| 7,664,753 B2 * | 2/2010 | Shelton | ......................... 707/783 |
| 8,402,555 B2 | 3/2013 | Grecia | |
| 8,533,860 B1 † | 9/2013 | Grecia | |
| 8,543,660 B2 | 9/2013 | Roberts et al. | |
| 2006/0212435 A1 * | 9/2006 | Williams et al. | ................. 707/3 |
| 2007/0005643 A1 * | 1/2007 | Korman | ..................... 707/104.1 |
| 2009/0254971 A1 * | 10/2009 | Herz | ....................... G06Q 10/10 726/1 |
| 2011/0016536 A1 | 1/2011 | O'Brien et al. | |
| 2011/0153396 A1 | 6/2011 | Marcuvitz et al. | |

(Continued)

OTHER PUBLICATIONS

Rosenblatt, Bill. "UltraViolet to Offer White Label Service." published Sep. 29, 2010 on Copyright and Technology: http://copyrightandtechnology.com/2010/09/29/ultraviolet-to-offer-white-label-service/ Retrieved Oct. 15, 2013 (2 pages).

(Continued)

*Primary Examiner* — Hung Q Pham
(74) *Attorney, Agent, or Firm* — Procopio, Cory, Hargreaves & Savitch LLP

(57) ABSTRACT

Storing, building, managing, and controlling consumer personal information, including: building at least one level of personal information according to a standard; storing the personal information on a consumer rights locker; defining a scope of access under terms of a consumer to control access to the consumer rights locker; transmitting a plurality of parameters needed to access the consumer rights locker; receiving a request to access the consumer rights locker and the plurality of parameters; comparing the plurality of parameters to the scope of access; and granting access to the consumer rights locker when it is determined that the request is valid, wherein the request is valid when the plurality of parameters includes an access right that is consistent with information in the scope of access. Keywords include consumer rights locker and personal information.

18 Claims, 3 Drawing Sheets

(56) References Cited

U.S. PATENT DOCUMENTS

| | | | |
|---|---|---|---|
| 2011/0238477 A1* | 9/2011 | Urbanski | G06Q 30/0224 705/14.25 |
| 2012/0084151 A1* | 4/2012 | Kozak | G06Q 30/02 705/14.58 |
| 2013/0262514 A1* | 10/2013 | Everett et al. | 707/781 |

OTHER PUBLICATIONS

Tribbey, Chris. "Six Questions: UltraViolet's Mitch Singer". published Sep. 3, 2010 on HM HomeMedia Magazine, Questex Media Group LLC: http://www.homemediamagazine.com/electronic-delivery/six-questions-ultraviolet%E2%80%99s-mitch-singer-20510 Retrieved Oct. 15, 2013 (2 pages).

Ulaby, Neda. "Introducing UltraViolet: Buy Your Digital Movie Once, Play it Anywhere?" published Jul. 20, 2010 on npr.com, NPR: http://www.npr.org/blogs/monkeysee/2010/07/19/128626624/introducing-ultraviolet-buy-your-movie-once-play-it-anywhere Retrieved Oct. 15, 2013 (2 pages).

\* cited by examiner
† cited by third party

CONSUMER RIGHTS LOCKER

BACKGROUND

Field of the Invention

The present invention relates to personal information, and more specifically, to storing, building, managing, and controlling personal information of a consumer.

Background

Today, consumers may spend a lot of time entering personal information to access an online service without much control over the process. It is frequently all or nothing in that the consumer must provide the requested information or no access to the online service will be granted. Further, if another online service is visited, the consumer needs to re-enter all of the personal information again, even though there is so much overlap in the information that is to be entered.

SUMMARY

The present invention provides for storing, building, managing, and controlling consumer personal information.

In one implementation, a method of storing, building, managing, and controlling consumer personal information is disclosed. The method includes: building at least one level of personal information according to a standard; storing the personal information on a consumer rights locker; defining a scope of access under terms of a consumer to control access to the consumer rights locker; transmitting a plurality of parameters needed to access the consumer rights locker; receiving a request to access the consumer rights locker and the plurality of parameters; comparing the plurality of parameters to the scope of access; and granting access to the consumer rights locker when it is determined that the request is valid, wherein the request is valid when the plurality of parameters includes an access right that is consistent with information in the scope of access.

In another implementation, a consumer rights locker system for storing, building, managing, and controlling personal information of a consumer stored on a consumer rights locker is disclosed. The system includes: a data manager configured to enable the consumer to build and manage at least one level of personal information and to store on the consumer rights locker according to a standard; an access manager configured to manage access to the personal information built, stored, and managed by the data manager, wherein the access manager defines a scope of access to the personal information under terms of the consumer, and transmits a plurality of parameters needed to access the consumer rights locker; and an access controller configured to receive the plurality of parameters and grant access to the consumer rights locker when information in the plurality of parameters matches information in the scope of access.

In yet another implementation, a non-transitory storage medium storing a computer program to store, build, manage, and control personal information of a consumer is disclosed. The computer program includes executable instructions that cause a computer to: build at least one level of personal information according to a standard; store the personal information on a consumer rights locker; define a scope of access under terms of a consumer to control access to the consumer rights locker; transmit a plurality of parameters needed to access the consumer rights locker; receive a request to access the consumer rights locker and the plurality of parameters; compare the plurality of parameters to the scope of access; and grant access to the consumer rights locker when it is determined that the request is valid, wherein the request is valid when the plurality of parameters includes an access right that is consistent with information in the scope of access.

Other features and advantages of the present invention will become more readily apparent to those of ordinary skill in the art after reviewing the following detailed description and accompanying drawings.

DETAILED DESCRIPTION

Figure 1:
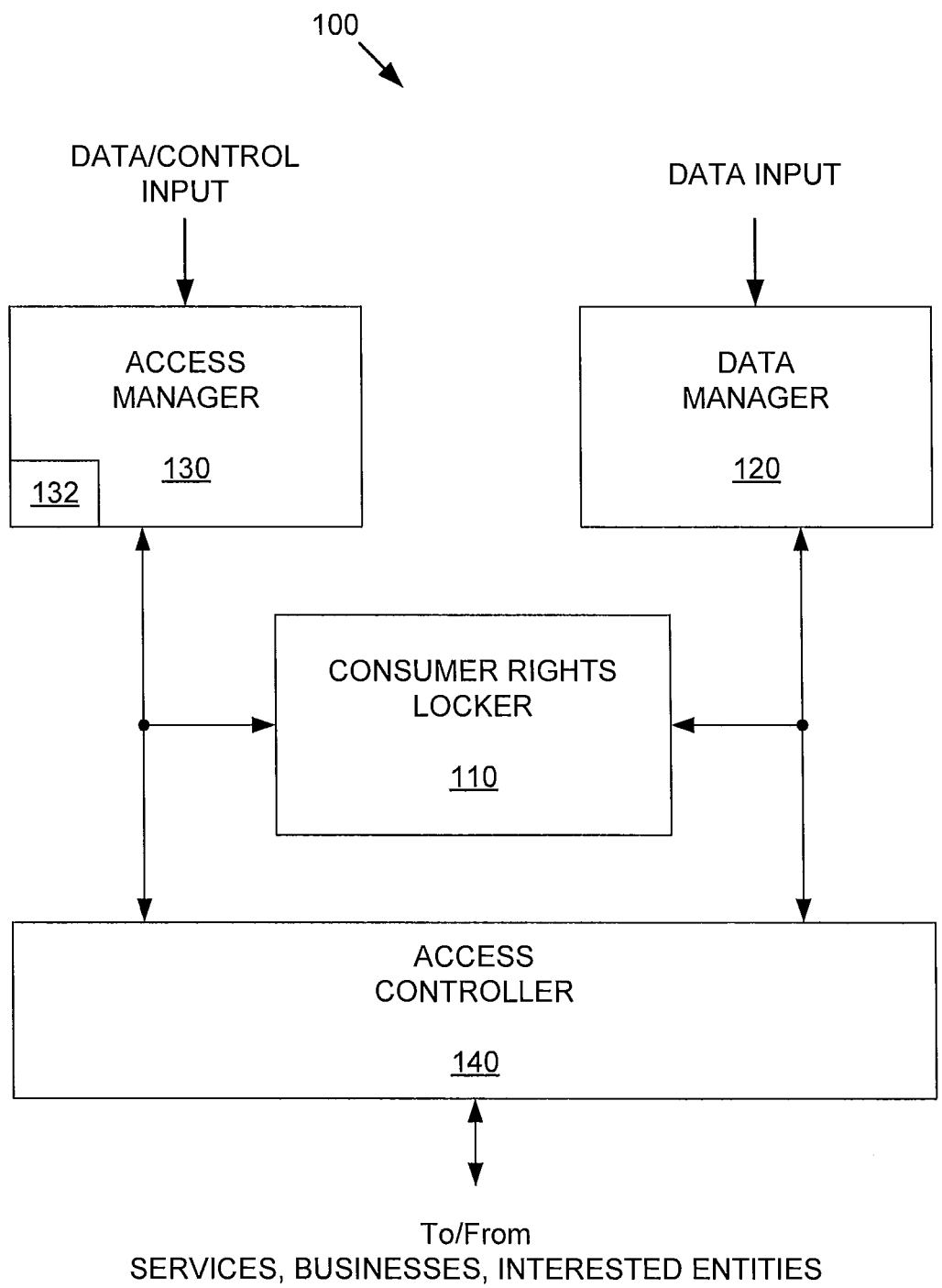
FIG. 1 is a functional block diagram of a consumer rights locker system which provides for storing, building, managing, and controlling consumer personal information in accordance with one implementation of the present invention.

Certain implementations as disclosed herein describe a consumer rights locker system which provides for storing and controlling consumer personal information. After reading this description it will become apparent how to implement the invention in various implementations and applications. Although various implementations of the present invention will be described herein, it is understood that these implementations are presented by way of example only, and not limitation. As such, this detailed description of various implementations should not be construed to limit the scope or breadth of the present invention.

As described above, a consumer may spend a lot of time entering personal information to access an online service without much control over the process. Currently, the online marketplace is one sided in that the consumer must provide the requested information (e.g., signing the terms of use and entering the requested personal information) or no access to the online service will be granted. Further, since the entered personal information is not transferable, the consumer needs to re-enter all of the personal information when the consumer visits a new online service. This will often be the case even when there is substantial overlap in the information that is to be entered.

In one implementation, the consumer rights locker system provides for storing and controlling consumer personal information on the "cloud". In one aspect, the consumer rights locker system allows the consumer to build, edit, and/or manage a profile of the consumer's personal information. In one example, the consumer builds at least one level of personal information including name, address, and phone number in one level, income and credit card number in another level, and preferences for cars, computers, travel, hotel, etc., in yet another level.

In another aspect, the consumer rights locker system enables the personal information stored on the cloud to be transferable and controllable. That is, the storage of the personal information on the cloud allows the consumer to control access to the personal information. In this scenario, the consumer grants access to the personal information stored on the cloud by defining the scope of access to the information under the terms of the consumer rather than the business. For example, the consumer defines the scope of access by deciding a particular level of the personal information that would be made available under certain conditions for a particular length of time or reusability. The consumer can also withdraw the information (or at least withdraw the consent for access to the information). Thus, the consumer has the ability to manage and view personal information stored on the cloud.

In a further aspect, although the consumer controls access to the personal information, the service provider can make various offers to entice the consumer. For example, if the consumer discloses more information, then the service provider provides better offer. In this aspect, the service provider adopts a standard for exchange in which the consumer has the control over the shared personal information, but the level of sharing by the consumer can be varied in accordance with varying levels of benefits provided by the service provider. That is, the standard includes features that vary based on the level of personal information shared by the consumer. For example, in accordance with the standard, the service provider may provide some basic features/functions for minimum information shared by the consumer. The service provider may provide some additional value-added features/functions to the consumer when the service provider is allowed access to further personal information by the consumer.

In another implementation, a standard for the personal information stored on a consumer rights locker is established to allow the services, businesses, and/or other interested entities to gain access and obtain the authorized level of personal information automatically. In one example, the standard includes a number of acceptable formats for the personal information so that the services, businesses, and/or other interested entities can gain access to the personal information electronically. In another example, the standard includes a template which would lay out various parameters needed to access the personal information from the consumer rights locker. For example, the parameters may include an online address (e.g., a uniform resource identifier (URI) or uniform resource locator (URL)) of the consumer rights locker and a key that would unlock the authorized level of the personal information.

In another implementation, various parameters needed to access the personal information from the consumer rights locker can be transmitted electronically to the services, businesses, and/or other interested entities by the consumer to enable prompt and automatic access by the services, businesses, and/or other interested entities. In one implementation, the parameters are transmitted online or by e-mail. In another implementation, the parameters are stored in carrying cards (e.g., credit cards), mobile phones, laptop computers, flash memories, and other devices (both portable and non-portable) suitable for storage of electronic data. Once these parameters in the form of an electronic data are stored on the carrying cards, mobile phones, laptop computers, flash memories, or other devices, the electronic data can be transmitted to the services, businesses, and/or other interested entities at the point of sale of the personal information.

In another implementation, the consumer rights locker system includes an overview (e.g., a dashboard view) of the scope of access for a consumer. The overview allows the consumer to view and determine what personal information was shared and with whom all in one place. The overview also enables the consumer to adjust data sharing policies/standards in one place so that when the consumer makes changes, the notice immediately goes out to all participating service providers. For example, the overview may show all services, businesses, and/or other interested entities that the consumer allowed access to the personal information stored on the consumer rights locker. The overview may also show which level of the personal information was shared with which online services. Further, the consumer rights locker system enables the consumer to manage the personal information as a content owner. In this scenario, the consumer controls the levels of personal information as a content owner and can sell these different levels of personal information to services, businesses, and/or other interested entities, for a value.

Allowing the consumer to control his or her own personal information also has advantages for services, businesses, and/or other interested entities that rely on the personal information to tailor and target advertisements and other notices because the information will be more accurate and relevant. The consumer control of the personal information will also improve data consistency and keep data current because the consumer can update at a single location and the changes will propagate to all authorized services, businesses, and/or other interested entities. The services, businesses, and/or other interested entities can reward the consumer for sharing accurate and relevant personal information by providing discounts, previews, samples, services, etc. The services, businesses, and/or other interested entities can also penalize the consumer for sharing inaccurate and/or irrelevant personal information by canceling discounts, previews, samples, services, etc., or not providing these benefits in the future.

FIG. 1 is a functional block diagram of a consumer rights locker system 100 which provides for storing, building, managing, and controlling consumer personal information in accordance with one implementation of the present invention. In the illustrated implementation of FIG. 1, the consumer rights locker system 100 includes a consumer rights locker 110, a data manager 120, an access manager 130, and an access controller 140.

The data manager 120 enables the consumer to build at least one level of personal information on the consumer rights locker 110. For example, the personal information can include name, address, and phone number in one level, income and credit card number in another level, and preferences for cars, computers, travel, hotel, etc., in yet another level. In building the levels of personal information, the data manager 120 builds according to a standard. Thus, the data built in accordance with the standard allows the services, businesses, and/or other interested entities to gain access and obtain the authorized level of personal information automatically. In one example, the standard includes a number of acceptable formats for building the personal information so that the services, businesses, and/or entities can gain access to the personal information electronically. In another example, the standard includes a template which would lay out various parameters needed to access the personal information from the consumer rights locker 110. For example, the parameters may include an online address (e.g., a uniform resource identifier (URI) or uniform resource locator (URL)) of the consumer rights locker 110 and a key that would unlock the authorized level of the personal information. In one implementation, the consumer rights locker 110 is located on the cloud.

The access manager 130 enables the consumer to control access to the personal information built and managed by the data manager 120. The access manager 130 allows the consumer to grant access to the personal information stored on the consumer rights locker 110 by defining the scope of access to the information under the terms of the consumer rather than the business. For example, the consumer defines the scope of access by deciding a particular level of the personal information that would be made available under certain conditions for a particular length of time or reusability. The consumer can also withdraw the information (or at least withdraw the consent for access to the information). Thus, the access manager 130 allows the consumer to manage and view access to personal information stored on the consumer rights locker 110.

In one implementation, various parameters needed to access the personal information from the consumer rights locker 110 can be transmitted electronically by an interface unit 132 to the services, businesses, and/or other interested entities by the access manager 130 to enable prompt and automatic access by the services, businesses, and/or other interested entities. In one implementation, the parameters are transmitted online or by e-mail. In another implementation, the interface unit 132 removably couples to carrying cards (e.g., credit cards), mobile phones, laptop computers, flash memories, and other devices (both portable and non-portable) suitable for storage of electronic data to transmit and store the parameters. Once these parameters in the form of an electronic data are stored on the carrying cards, mobile phones, laptop computers, flash memories, or other devices, the electronic data can be transmitted to the services, businesses, and/or other interested entities at the point of sale of the personal information.

In another implementation, the access manager 130 provides an overview of the scope of access for the consumer. For example, the overview may show all online services that the consumer has allowed access to the personal information stored on the cloud. The overview may also show which level of the personal information was shared with which online services. Further, the access manager 130 enables the consumer to manage access to the personal information as a content owner. In this scenario, the access manager 130 controls access to the levels of personal information as a content owner and can sell these different levels of personal information to services, businesses, and/or other interested entities, for a value. The access controller 140 controls access to the consumer rights locker 110 by the services, businesses, and/or other interested entities based on the scope of access defined by the access manager 130.

In one implementation, the access is controlled by the access controller 140 using a template which would lay out various parameters needed to access the personal information from the consumer rights locker 110. For example, the parameters may include an online address (e.g., a uniform resource identifier (URI) or uniform resource locator (URL)) of the consumer rights locker 110 and a key that would unlock the authorized level of the personal information. As described above, in one example, the parameters needed to access the personal information from the consumer rights locker 110 can be transmitted electronically to the services, businesses, and/or other interested entities by the access manager 130. These parameters may be stored in the form of an electronic data on carrying cards, mobile phones, laptop computers, flash memories, or other devices, and can be transmitted to the services, businesses, and/or other interested entities at the point of sale of the personal information.

Once the services, businesses, and/or other interested entities obtain the parameters such as online address and a key, the parameters are presented to the access controller 140 to obtain access to the consumer rights locker 110. The access controller 140 then compares the parameters presented by the services, businesses, and/or other interested entities to the scope of access maintained by the access manager 130 to verify the authorization of the services, businesses, and/or other interested entities to the consumer rights locker 110. Once the access controller 140 verifies the parameters, access to the consumer rights locker 110 is granted to the services, businesses, and/or other interested entities.

Figure 2:
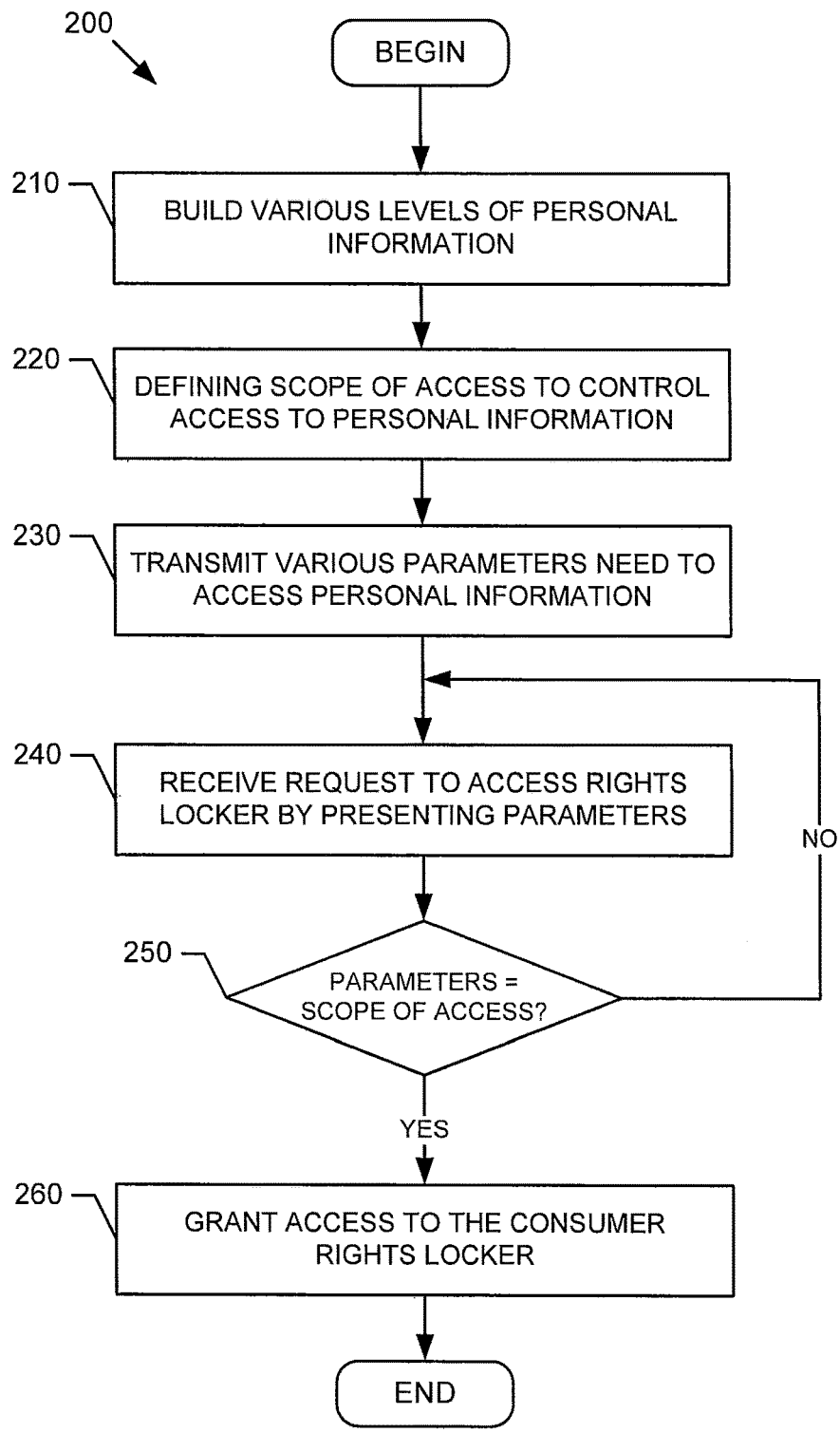
FIG. 2 is a flowchart illustrating a method of storing, building, managing, and controlling consumer personal information in accordance with one implementation of the present invention.

FIG. 2 is a flowchart 200 illustrating a method of storing, building, managing, and controlling consumer personal information in accordance with one implementation of the present invention. In the illustrated implementation of FIG. 2, at least one level of personal information is built according to a standard and stored on the consumer rights locker, at box 210. For example, the personal information can include name, address, and phone number in one level, income and credit card number in another level, and preferences for cars, computers, travel, hotel, etc., in yet another level. The levels of personal information are built according to a standard which allows the services, businesses, and/or other interested entities to gain access and obtain the authorized level of personal information automatically. In one example, the standard includes a number of acceptable formats for building the personal information so that the services, businesses, and/or entities can gain access to the personal information electronically. In another example, the standard includes a template which would lay out various parameters needed to access the personal information from the consumer rights locker. For example, the parameters may include an online address (e.g., a uniform resource identifier (URI) or uniform resource locator (URL)) of the consumer rights locker and a key that would unlock the authorized level of the personal information.

A scope of access is defined under the terms of the consumer, at box 220, to control access to the personal information. For example, the consumer defines the scope of access by deciding a particular level of the personal information that would be made available under certain conditions for a particular length of time or reusability. The consumer can also withdraw the information (or at least withdraw the consent for access to the information). An overview of the scope of access may show all online services that the consumer has allowed access to the personal information stored on the cloud. The overview may also show which level of the personal information was shared with which online services. Further, the scope of access may define the cost or value of these different levels of personal information for different services, businesses, and/or other interested entities. That is, different charges may apply to different entities.

Various parameters needed to access the personal information from the consumer rights locker is then transmitted, at box 230, to the services, businesses, and/or other interested entities. In one implementation, the parameters are transmitted electronically to enable prompt and automatic access by the services, businesses, and/or other interested entities. The parameters may include an online address (e.g., a uniform resource identifier (URI) or uniform resource locator (URL)) of the consumer rights locker 110 and a key that would unlock the authorized level of the personal information. As described above, in one example, the parameters needed to access the personal information from the consumer rights locker 110 can be transmitted electronically to the services, businesses, and/or other interested entities by the access manager 130. These parameters may be stored in the form of an electronic data on carrying cards, mobile phones, laptop computers, flash memories, or other devices, and can be transmitted to the services, businesses, and/or other interested entities at the point of sale of the personal information.

In one implementation, the parameters are transmitted online or by e-mail. In another implementation, the parameters are stored in carrying cards (e.g., credit cards), mobile phones, laptop computers, flash memories, and other devices (both portable and non-portable) suitable for storage of electronic data. Once these parameters in the form of an electronic data are stored on the carrying cards, mobile phones, laptop computers, flash memories, or other devices, the electronic data can be transmitted to the services, businesses, and/or other interested entities at the point of sale of the personal information.

Once the scope of access is defined and the parameters have been transmitted, requests to access the consumer rights locker are received, at box 240, from the services, businesses, and/or other interested entities by presenting the parameters. The parameters presented by the services, businesses, and/or other interested entities are then compared to the scope of access, at box 250, to verify the authorization of the services, businesses, and/or other interested entities to the consumer rights locker. Once the authorization is verified, at box 250, access to the consumer rights locker is granted, at box 260, to the services, businesses, and/or other interested entities.

Figure 3A:
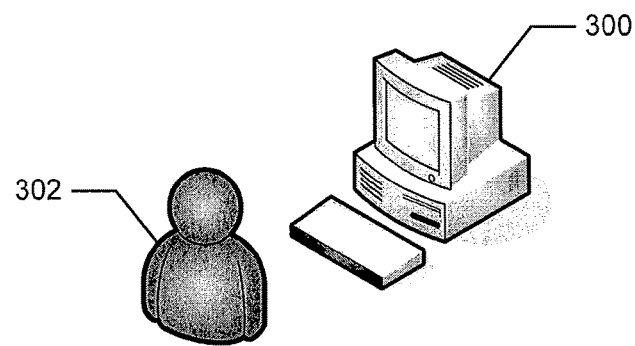
FIG. 3A illustrates a representation of a computer system and a user.

FIG. 3A illustrates a representation of a computer system 300 and a user 302. In one implementation, the computer system can be configured as a consumer rights locker system (e.g., reference 100 in FIG. 1).

Figure 3B:
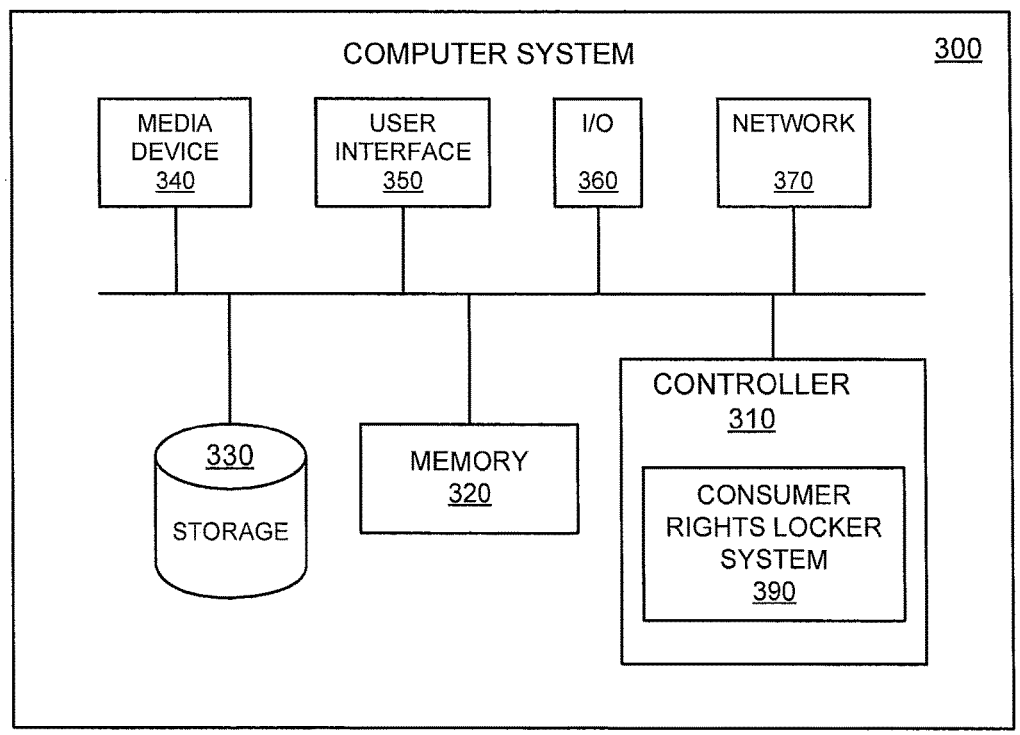
FIG. 3B is a functional block diagram illustrating the computer system hosting a consumer rights locker system.

FIG. 3B is a functional block diagram illustrating the computer system 300 hosting a consumer rights locker system 390 (similar to reference 100 in FIG. 1). The controller 310 is a programmable processor and controls the operation of the computer system 300 and its components. The controller 310 loads instructions (e.g., in the form of a computer program) from the memory 320 or an embedded controller memory (not shown) and executes these instructions to control the system. In its execution, the controller 310 provides the consumer rights locker system 390 as a software system. Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Non-transitory storage 330 stores data for use by other components of the computer system 300, such as for storing data used by the consumer rights locker system 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the agent 302 and presenting information to the agent 302. In one implementation, the user interface 350 includes a keyboard, a mouse, audio speakers, and a display. The controller 310 uses input from the agent 302 to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 302.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, although the specification describes a consumer rights locker storing personal information located on the cloud, the consumer rights locker can be stored anywhere that provides easy access such as on storage of a desktop computer. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method of storing, building, managing, and controlling personal information of a consumer, the method comprising:

building a plurality of levels of personal information according to a standard;

storing the plurality of levels of personal information on a consumer rights locker;

defining a scope of access under terms of the consumer to control access to the consumer rights locker, wherein the scope of access is viewed and modified by the consumer and a notice is sent to at least one service provider accessing the personal information when the scope of access is modified by the consumer;

transmitting a plurality of parameters needed to access the consumer rights locker;

receiving a request to access the consumer rights locker and the plurality of parameters;

comparing the received plurality of parameters to the scope of access; and granting access to at least one level of the plurality of levels of the personal information in the consumer rights locker when it is determined that the request is valid, wherein the request is valid when the plurality of parameters includes an access right that is consistent with information in the scope of access, wherein the terms of the consumer include a right of the consumer to vary the scope of access to the at least one level of personal information in response to offers from the at least one service provider accessing the at least one level of personal information, wherein the consumer controls the scope of access to the at least one level of personal information in accordance with varying levels of benefits provided by the at least one service provider, wherein the at least one service provider penalizes the consumer by cancelling benefits when the consumer provides inaccurate personal information, wherein cancelling the benefits includes cancelling at least one of discounts, previews, samples, and services, or not providing the benefits.

2. The method of claim 1, wherein the at least one level of personal information comprises at least one of name, address, phone number, income, credit card number, preferences for cars, computers, travel, and hotel, arranged into different levels.

3. The method of claim 1, wherein building a plurality of levels of personal information according to a standard comprises arranging the personal information so that it can be automatically accessed.

4. The method of claim 1, wherein the standard comprises a template which lays out a plurality of parameters needed to access the at least one level of personal information from the consumer rights locker.

5. The method of claim 4, wherein transmitting a plurality of parameters needed to access the consumer rights locker comprises transmitting an online address of the consumer rights locker and a key that would unlock a specifically authorized level of the personal information.

6. The method of claim 1, wherein defining a scope of access comprises granting access to a particular level of the personal information.

7. The method of claim 6, wherein the scope of access further defines conditions and duration of the access to the particular level of the personal information.

8. The method of claim 6, wherein defining a scope of access comprises withdrawing access to the particular level of the personal information.

9. The method of claim 1, further comprising providing an overview of the scope of access showing the online businesses and services that are allowed access to the consumer rights locker.

10. The method of claim 1, wherein defining a scope of access comprises defining a cost or value of the at least one level of personal information.

11. The method of claim 1, wherein the plurality of parameters is stored in the form of an electronic data on at least one of carrying cards, mobile phones, laptop computers, and flash memories.

12. The method of claim 1, wherein a first level of the scope of access to personal information provides a first level of benefits from the at least one service provider and a second level of the scope of access to personal information provides a second level of benefits from the at least one service provider, wherein the first level of the scope of access provides access to more personal information than the second level of the scope of access and the first level of benefits provides more benefits than the second level of benefits.

13. A non-transitory storage medium storing a computer program to store, build, manage, and control personal information of a consumer, the computer program comprising executable instructions that cause a computer to:

build a plurality of levels of personal information according to a standard;

store the plurality of levels of personal information on a consumer rights locker;

define a scope of access under terms of the consumer to control access to the consumer rights locker, wherein the scope of access is viewed and modified by the consumer and a notice is sent to at least one service provider accessing the personal information when the scope of access is modified by the consumer;

transmit a plurality of parameters needed to access the consumer rights locker;

receive a request to access the consumer rights locker and the plurality of parameters;

compare the received plurality of parameters to the scope of access; and grant access to at least one level of the plurality of levels of the personal information in the consumer rights locker when it is determined that the request is valid, wherein the request is valid when the plurality of parameters includes an access right that is consistent with information in the scope of access, wherein the terms of the consumer include a right of the consumer to vary the scope of access to the at least one level of personal information in response to offers from the at least one service provider accessing the at least one level of personal information, wherein the consumer controls the scope of access to the at least one level of personal information in accordance with varying levels of benefits provided by the at least one service provider, wherein the at least one service provider penalizes the consumer by cancelling benefits when the consumer provides inaccurate personal information, wherein cancelling the benefits includes cancelling at least one of discounts, previews, samples, and services, or not providing the benefits.

14. The non-transitory storage medium of claim 13, wherein executable instructions that cause a computer to build at least one level of personal information according to a standard comprises executable instructions that cause a computer to arrange the personal information so that it can be automatically accessed.

15. The non-transitory storage medium of claim 13, wherein executable instructions that cause a computer to define a scope of access comprises executable instructions that cause a computer to grant access to a particular level of the personal information.

16. The non-transitory storage medium of claim 15, wherein the scope of access further defines conditions and duration of the access to the particular level of the personal information.

17. The non-transitory storage medium of claim 13, further comprising executable instructions that cause a computer to provide an overview of the scope of access showing the online businesses and services that are allowed access to the consumer rights locker.

18. The non-transitory storage medium of claim 13, wherein a first level of the scope access to personal information provides a first level of benefits from the at least one service provider and a second level of the scope of access to personal information provides a second level of benefits from the at least one service provider, wherein the first level of the scope of access provides access to more personal information than the second level of the scope of access and the first level of benefits provides more benefits than the second level of benefits.

* * * * *